July 31, 1962    H. W. DIETERT ETAL    3,046,623
TWO-STAGE MOISTURE METER
Filed April 27, 1959    2 Sheets-Sheet 1
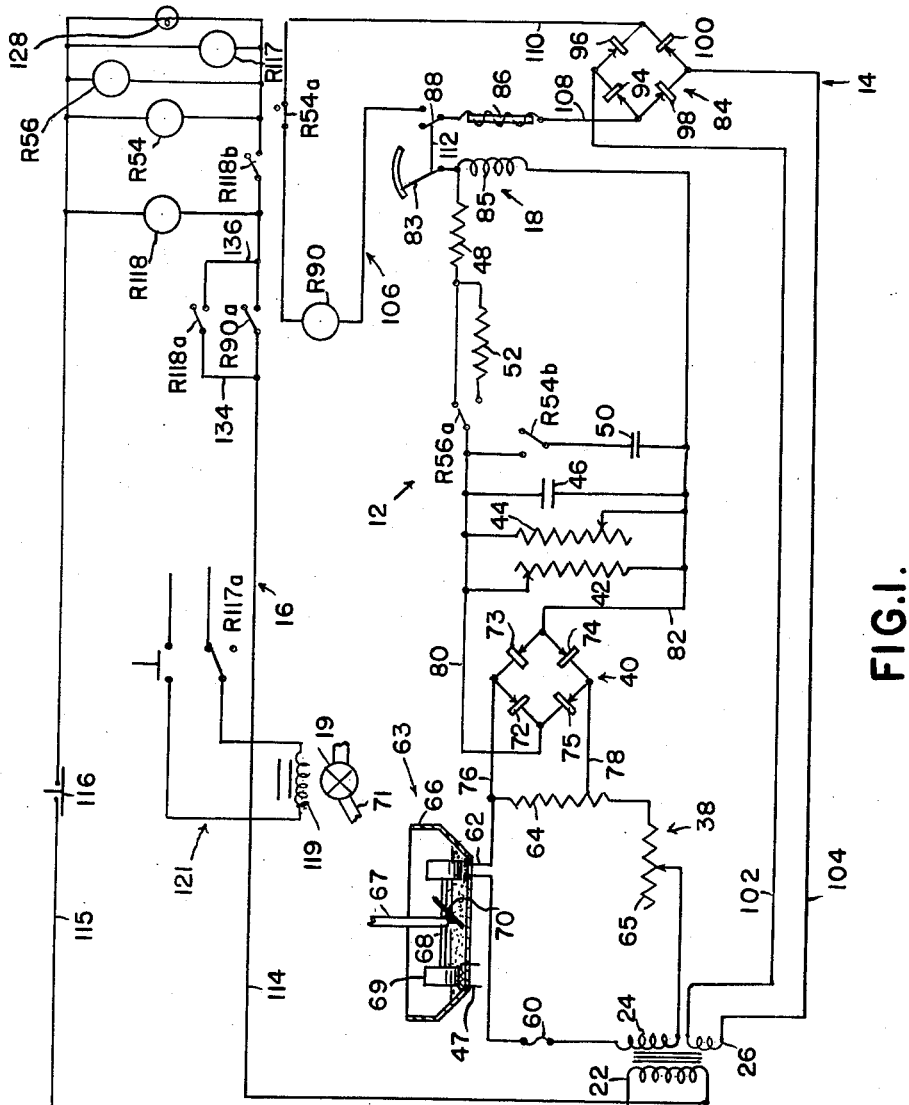
INVENTORS
HARRY W. DIETERT
ALEXANDER L. GRAHAM
BY
Whittemore, Hulbert
& Belknap
ATTORNEYS

3,046,623
TWO-STAGE MOISTURE METER
Harry W. Dietert and Alexander L. Graham, Detroit, Mich., assignors to Harry W. Dietert Co., Detroit, Mich., a corporation of Michigan
Filed Apr. 27, 1959, Ser. No. 809,009
5 Claims. (Cl. 22—89)

The present invention relates to the combination of a mill or mixer for granular material, such as sand, to which water is added, and a two stage moisture meter for measuring and indicating the moisture content of the sand and refers more particularly to apparatus for developing an electrical signal proportional to the moisture content of a granular material including means to visually indicate the developed signal and automatic means to stabilize and reduce the visual indication of the signal in response to the signal reaching a predetermined magnitude.

It is an object of the present invention to provide apparatus for developing and indicating an electrical signal proportional to a variable condition including means to visually indicate a portion of the signal and means to stabilize and reduce the indicated portion of the signal in response to the signal reaching a predetermined magnitude.

Another object of the present invention is to provide apparatus for developing and indicating an electrical signal proportional to a variable condition including unstable and stable means to visually indicate a portion of the signal and means operable in conjunction with said unstable indicating means to automatically halt the varying of said condition in response to individual parts of the signal reaching a predetermined magnitude.

Another object of the present invention is to provide apparatus for developing and indicating an electrical signal proportional to a varied condition including means to visually indicate a portion of the signal and means to automatically halt the varying of the condition in response to the signal reaching a predetermined magnitude.

Another object is to provide an electrical meter for measuring and indicating the moisture content of solid granular material as the moisture content is varied which uses a circuit containing a first filter capacitor and current limiting resistor to the meter circuit during which the moisture content of the granular material is relatively low, the meter automatically halting the addition of moisture and adding a second filter capacitor and a second current limiting resistor to the meter circuit when the moisture content of the granular material is indicated to be a predetermined amount and thereafter measuring and indicating the moisture content of the granular material with the modified electrical circuit in a second stage of operation during which the total moisture content of the granular material is substantially constant.

More specifically it is an object of the present invention to provide apparatus for developing and indicating an electrical signal proportional to the moisture content of a granular material including a meter responsive to a portion of the developed signal and means operably associated with the meter to automatically halt the addition of moisture to the granular material and to stabilize and reduce the portion of the developed signal applied to the meter in response to the moisture content of the granular material reaching a predetermined value.

Still more specifically, it is an object of the present invention to provide means for developing and indicating an electrical signal proportional to the moisture content of solid granular material as the moisture content is varied including a mill in which the granular material may be mixed and moisture added thereto, an impedance responsive probe to develop a signal proportional to the moisture content of the granular material, means to adjust the signal to compensate for the original temperature of the granular material and for different granular materials, a meter responsive to a portion of the developed signal and means to automatically halt the addition of moisture to the granular material and to stabilize and reduce the portion of the developed signal applied to the meter in response to the direct signal reaching a predetermined value.

Another object of the present invention is to provide a two stage moisture meter which is simple in construction, easy to manufacture and efficient in use.

Other objects and features of the invention will become apparent as the description proceeds especially when taken in conjunction with the accompanying drawing, illustrating a preferred embodiment of the invention, wherein:

FIGURE 1 is a partly diagrammatic and partly schematic illustration of a two stage moisture meter according to this invention.

FIGURE 2 is an illustration of the control panel of the moisture meter of FIGURE 1.

Figure 3:
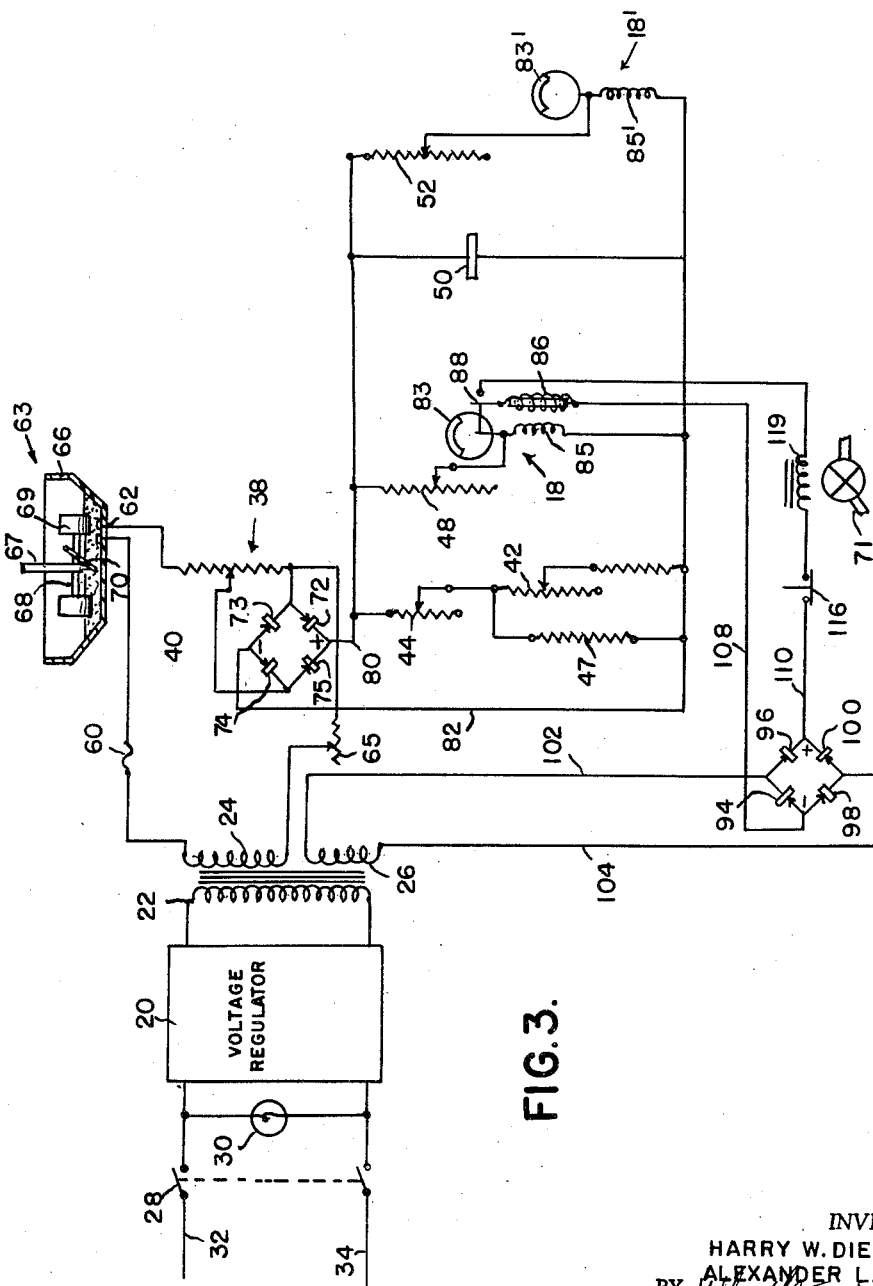
FIGURE 3 is a partly diagrammatic and partly schematic illustration of a modification of the two stage moisture meter of the invention.

The present invention is useful generally in producing solid granular material having a desired moisture content. By way of specific example the granular material may be foundry sand which must be moistened to give it the required consistency for use in the foundry. To insure proper moistening of the sand it is desirable to measure the moisture content of the sand substantially constantly while adding moisture thereto. Since the moisture content of foundry sand is generally relatively low before moisture is added and the moisture content required of the sand to be used is relatively high, in order to continuously measure the moisture content of the sand during the addition of moisture thereto, it is desirable that a moisture meter be used which is operative over a wide range of sand moisture contents. Applicant provides a two stage electrical moisture meter for this purpose.

The first stage of the moisture meter operates to measure the initial moisture content of the sand and subsequent moisture contents as moisture is added to the sand until the moisture content reaches a predetermined value. As the moisture content approaches the predetermined value the indicator of the moisture meter will approach an upper limit reading and the reading will become unstable. This high, unstable indication is caused by the electrical properties of the circuit elements which are necessarily used in the meter during first stage operation to allow measurement of the initial low moisture content of the sand. When the moisture meter indicates the predetermined value of moisture content, the electrical circuit of the moisture meter operates automatically to halt the addition of moisture to the sand and to place additional circuit elements in operation which reduce and stabilize the indicator reading. The second stage of the moisture meter is thus initiated allowing further measurement and indication of the moisture in the sand as the sand is mixed.

From the above brief description it should be obvious that the second stage of operation of such a two stage moisture meter may be used by itself in the control of the moisture content of granular material. Using only the second stage of operation of the meter the operator can read the moisture content of the sand before discharging it from the mixer and when the cycle of mixing is long enough can use the information read to correct the moisture content of the sand during the mixing cycle by addition of dry sand or moisture. In such operation the moisture addition would of course be halted at a predetermined time before the end of the mixing period to insure proper mixing of the moisture with the granular material.

In applications where the mixing cycle is short, the single stage of the meter will not react quickly enough to the addition of moisture to the material being mixed to allow the operator to stop the addition of water on the basis of the stable second stage meter reading of the moisture content for the reason that there is a time lapse between the time the moisture content of the granular material is sampled and the time of indication thereof due to the necessity of filtering individual sample signals before they are applied to the indicator so that the indicator on said meter will be a stable indication. In two stage operation therefore the addition of moisture to the granular material is halted automatically when a single sample signal reaches a predetermined maximum by application of the sample signals to a substantially unfiltered and therefore relatively unstable meter in the last part of the first stage of operation. The unstable indictator by reason of lack of filtering of the sample signals reacts to each sample signal and gives a momentary indication of the maximum value thereof which is used according to the invention to give substantially faster moisture content information. Due to the greater moisture content at the point of entry of moisture to the meter however even individual maximum sample signal meter readings do not reflect the actual moisture present in the mix but indicate the moisture content of the sand at the moisture sensing element, thus after moisture addition is halted mixing of the granular material is necessary and indicated moisture content thereof will increase.

Using both stages of the two stage moisture meter it is possible to add moisture to the sand for the entire length of first stage operation and when the moisture content increases to the point where second stage operation is desirable the moisture addition can be discontinued either automatically or manually in response to a warning light. The mixing may then be allowed to continue with subsequent meter readings indicating the moisture content of the completely mixed sand as desired. The two stage operation makes it possible to accurately control the moisture of the sand even during very short mixing cycles due to control of the moisture addition by an unstable indicator capable of responding to momentary maximum sample signal indications of moisture content of the granular material.

The specific embodiment of the present invention illustrated in FIGURE 1 includes a power source generally designated 10 to supply regulated alternating voltage to three circuits generally designated 12, 14 and 16. Circuit 12 performs the function of developing a signal proportional to the moisture content of the sand being processed and contains an indicator 18 for presenting a visual representation of the moisture content of the sand. Circuit 14 functions automatically in response to a representation on indicator 18 of a predetermined said moisture content to actuate circuit 16. Circuit 16 then causes additional circuit elements to be switched into circuit 12 and moisture addition valve 19 to close. The additional elements in circuit 12 effect a reduction of the visual representation on indicator 18 of a particular moisture content of the sand being processed and also stabilize the visual representation on indicator 18. Thus the source of power 10 and the circuits 12, 14 and 16 function together to represent on indicator 18 the moisture content of sand in two stages. The stage of operation of the moisture meter at a particular time during a cycle depends on the maximum value of the periodic or pulsating sample signals of moisture content of the sand being processed which have been received up to that time.

The power source 10, as illustrated, includes a voltage regulator 20, a transformer having primary winding 22 and secondary windings 24 and 26, a switch 28, indicator light 30 and leads 32 and 34. The free ends of leads 32 and 34 are adapted to be connected across a common 115 volt, 60 cycle source of electrical energy. Light 30, voltage regulator 20 and transformer primary 22 are connected across leads 32 and 34. Leads 32 and 34 are broken by switch 28 as shown between the 115 volt energy source and light 30. With switch 28 open light 30 is off and transformer primary 22 is not energized. Closing switch 28 energizes transformer primary 22 through voltage regulator 20 and causes light 30 to illuminate indicating that primary power is being applied to the moisture meter. Both light 30 and switch 28 are on the control panel of the moisture meter as shown in FIGURE 2. With transformer primary 22 energized, transformer secondary windings 24 and 26 apply power to circuits 12 and 14 respectively. A regulated 115 volts is applied to circuit 16 directly from voltage regulator 20 as indicated. Transformer secondary 24 is constructed to deliver a regulated 55 volts to circuit 12. Transformer secondary 26 is constructed so that a regulated 24 volts is applied to circuit 14. Voltage regulator 20 may be of any type and is provided to prevent line voltage fluctuation from the power source from effecting the moisture content representation on indicator 18.

Circuit 12 includes series loop circuit 38, rectifier 40, compensating rheostats 42 and 44, first stage filter capacitor 46 and current limiting resistor 48, second stage filter capacitor 50 and current limiting resistor 52, relay switches R54b and R56a and visual indicator 18. Circuit 12 produces one of the desired end results in the moisture meter consisting of a visual representation of the moisture content of the sand as the moisture content is varied over a wide range.

Series loop 38 includes transformer secondary 24, fuse 60, probe 62 exposed to moist sand in a mill or mixer 63, load resistance 64, and rheostat 65 connected in series in a closed circuit as shown. An alternating signal proportioned to the moisture content of the foundry sand is developed in series loop 38 across probe 62 on application of power to transformer secondary 24. Fuse 60 is provided to prevent damage to circuit 12 should the signal developed in loop 38 become too large. Rheostat 65 provides an adjustable initial setting for the current flow in loop 38 to assure operation of circuit 12 in the proper signal magnitude range. An alternating electrical signal proportional to the alternating signal developed in loop 38 is taken from loop 38 across a portion of resistor 64 and is fed to rectifier 40.

The development of an alternating signal proportional to the moisture content of the foundry sand is accomplished in loop 38 by means of a sand mill or mixer generally indicated 63 in conjunction with an impedance responsive probe 62. As shown mixer 63 includes circular sand receptacle 66 having probe 62 mounted in the bottom thereof, rotating shaft 67 having axle 68 on the end thereof, a pair of wheels 69 on opposite ends of axle 68 and an elongated scraper 70 secured to shaft 67 and extending across sand receptacle 66. In operation, sand having an initial moisture content is placed in mixer 63. The sand acts as a variable impedance across the probe 62 and permits a small signal alternating at 60 cycles to develop in circuit 38. Shaft 67 is rotated causing wheels 69 to pass over probe 62 alternately with the ends of scraper 70. The sand between the electrodes of probe 62 will therefore be alternately compressed by rollers 69, and removed by scrapers 70. Since the compressed sand presents much less impedance between the electrodes of probe 62 the alternating signal developed in loop 38 will be greatly increased as the wheels 69 pass over probe 62. Therefore, as moisture is added to the sand by any convenient means 71 with shaft 67 rotating the signal developed in series loop 38 will be an increasing signal alternating at 60 cycles and becoming very large as wheels 69 pass over probe 62 and being relatively small at other times. The cyclical variation of the developed signal due to the rotation of shaft 67 may be on the order of one or a few cycles per minute. The scraper 70 serves to thoroughly mix the added moisture with the sand so that the signal developed as wheels 69 pass over probe 62 is representative of the moisture content of all of the sand in mill 63. It should at this point be pointed out that the relatively long cyclical variation just referred to is a major reason for the using of the unstable meter to halt the addition of water to the granular material as many cycles may be required before a stable filtered indicator will indicate a particular maximum sample signal value even though each successive signal increases slightly.

The probe 62 is of the type disclosed in applicants' copending application Serial No. 567,820, filed February 27, 1956, now abandoned. The probe includes a pair of electrodes having sand therebetween. The sand presents variable impedance to signals developed between the electrodes. This impedance decreases as moisture is added to the sand or when the sand is compressed as by wheels 69. The exact details of a probe similar to probe 62 may be found in the above indicated application, and since they form no part of the present invention they will not be discussed further here.

As previously indicated a part of the alternating signal proportional to the signal developed in loop 38 is applied to rectifier 40. In rectifier 40 this signal is converted to a pulsating direct signal still proportional to the signal developed in loop 38 and therefore to the moisture content of the sand being processed. Rectifier 40 as illustrated is a common full wave rectifier including four single direction elements 72, 73, 74 and 75 connected as shown and also including input leads 76 and 78 and output leads 80 and 82. The signal output of rectifier 40 across leads 80 and 82 is a direct signal pulsating at 60 cycles per second and becoming very large as wheels 69 pass over probe 62 in relation to its magnitude when wheels 69 are not in a position over the probe.

Compensating rheostat 42 or a resistor 47, the resistance of which changes with the temperature thereof such as is sold under the name "Thermistor" and compensating rheostat 44 are to be connected across rectifier 40 between output leads 80 and 82 so that they are in parallel with indicator 18 with respect to rectifier 40. Variation of either rheostat 42 or 44 will cause the current flowing in rheostats 42 and 44 and in indicator 18 due to the voltage produced across output leads 80 and 82 of rectifier 40 to vary proportionately. Thermistor 47 is automatically varied to produce the same result as variation of rheostat 42. Rheostat 42 is used is varied according to the temperature of the foundry sand being processed so that the current through meter 18 will produce a true reading of the moisture content of the sand being processed even though the temperature of different sand batches varies widely. This is accomplished by selecting a reference temperature and varying the resistance in parallel with rectifier 40 so that the current flowing through indicator 18 will always be equal to that which would flow through the indicator if the sand were at the reference temperature. The indicator representation of the moisture content of the sand will then be independent of the temperature of a particular sand. Particular rheostat settings for particular temperatures must be predetermined by experimentation and are indicated on the control panel of the moisture meter illustrated in FIGURE 2. The wiper arm of rheostat 42 is connected to pointer 43 on the control panel in such a manner that when pointer 43 is set on the calibrated temperature of the sand being processed as indicated on temperature dial 45 in FIGURE 2 the resistance of rheostat 42 is such that the current through indicator 18 will be the same as it would be if sand of the reference temperature were being processed.

As indicated thermistor 47 may be used in place of rheostat 42 to correct for the effect of temperature changes on the meter indication of the moisture content of the sand. The function of thermistor 47 and its connection in circuit 12 would be the same as indicated for rheostat 42 with the exception that the resistive element must be placed in the mill in association with the sand. However since the thermistor automatically changes resistance values on a change of temperature it would not be necessary with the use of a properly designed thermistor to manually select the resistance setting corresponding to a particular temperature as is the case with rheostat 42.

Rheostat 44 in the same manner is varied to correct for the effect of the varied composition of different sands on the moisture meter. Each sand to be processed must be tested to determine its relative sand factor or resistance to the development of a signal in circuit 38 and a setting for rheostat 44 determined for each sand which will provide current through indicator 18 which will be substantially independent of the type of sand being processed. Particular settings for rheostat 44 for particular sands may be accomplished by rotating pointer 51 on the control panel into alignment with the appropriate sand factor calibration on the face of the moisture meter control panel shown in FIGURE 2. Pointer 51 is mechanically connected to the wiper arm of rheostat 44 in a manner similar to the connection between pointer 43 and rheostat 42.

Capacitor 46 connected in circuit 12 in parallel across the output of rectifier 40 in conjunction with rheostats 42 and 44 and resistor 48 serves as a filter or stabilizing capacitor with respect to the signal output of rectifier 40. Capacitor 46 stores energy during periods of high output from rectifier 40, principally caused by wheels 69 passing over probe 62 in mill 63, and feeds the stored energy into circuit 12 at other times during periods of relatively low output from rectifier 40. The pulsating direct output signal from the rectifier 40 due to the 60 cycle alternations of the power source and due to the rotational frequency of shaft 67 are thus smoothed by capacitor 46. This smoothed output signal is applied through resistor 48 to indicator 18 and for low sand moisture contents it produces a stable representation thereon proportional to the output signal of rectifier 40.

Resistor 48 besides serving as part of the filter circuit of rectifier 40 to smooth the pulsating direct output signal of the rectifier, also serves to limit the portion of the signal developed by rectifier 40 which produces a representation on indicator 18. The exact portion of the signal produced by rectifier 40 which produces the representation on indicator 18 will be determined by the relative resistances of rheostats 42 and 44, resistor 48 and the electrical resistance of indicator 18. Resistance 48 must be selected to be of a value so that together with rheostats 42 and 44, the signal that reaches the indicator 18 during the initial stage of operation of the moisture meter will be within the operating range of the indicator.

Capacitor 50 is provided in circuit 12 to assist capacitor 46 in filtering or smoothing the output of rectifier 40 when the output becomes so large that capacitor 46 cannot store sufficient energy during periods of high signal from the rectifier to feed circuit 12 at close to the same high energy level during periods of low signal from the rectifier. At this time capacitor 50 is placed in circuit 12 by closing relay switch R54b by means of relay R54 in circuit 16. Capacitor 50 is necessary to provide a stable representation on indicator 18 during the second stage of operation. Without capacitor 50 the representation on indicator 18 would tend to follow unsmoothed variations in the output signal of the rectifier during second stage operation of the moisture meter.

Resistor 52 by means of relay switch R56a actuated by relay R56 in circuit 16 is placed in series with indicator 18 and resistor 48 at the same time capacitor 50 is placed in circuit 12. Resistor 52 serves to further limit the portion of the signal developed by rectifier 40 which passes through indicator 18 during second stage operation and provides a lower indicator representation for the same smoothed signal from rectifier 40 during second stage operation than during first stage operation thereby extending the effective range of indicator 18 for second stage operation.

Indicator 18 as shown is connected in series with resistor 48 and at time of high signal from rectifier 40 is also connected in series with resistor 52 across the output of rectifier 40. Indicator 18 may be any indicator such as a micro-amp. meter capable of producing visual representations on application thereto of small direct currents. If desired the meter may be calibrated for first and second stage operation on separate scales directly in moisture content of the sand being processed. The dial 83 of indicator 18 is visible on the control panel of the moisture meter as shown in FIGURE 2. The actuating element in indicator 18 is shown as a coil 85.

Circuit 14 includes transformer secondary 26, rectifier 84, electromagnet 86, switch 88, relay R90 and normally closed relay switch R54a. Circuit 14 activates circuit 16 in response to a representation on indicator 18 of a predetermined magnitude.

Rectifier 84 is similar to rectifier 40 and as shown is a full wave rectifier including four single direction elements 94, 96, 98 and 100 connected in the usual manner.

An alternating signal is developed across transformer secondary 26 when power source switch 28 is closed. This alternating signal is applied to rectifier 84 through conductors 102 and 104. The alternating signal is rectified in rectifier 84. The output from rectifier 84 is therefore a direct signal which is applied through conductors 108 and 110 to the closed series loop 106 which includes electromagnet 86, switch 88, relay R90 and relay switch R54a.

Switch 88 is mechanically connected to the indicator 18 as shown diagrammatically at 112 so that when the indicator represents a predetermined value of moisture content in the sand being processed switch 88 will close. When switch 88 is closed pointer 83 of indicator 18 is in a fixed position. Connection 112 is not an electrical connection. Closing switch 88 completes series loop 106 thereby energizing electromagnet 86 and relay R90. Electromagnet 86 on being energized functions to hold switch 88 closed after its initial closure by indicator 18 thereby momentarily locking indicator pointer 83 in a fixed position. Relay R90 closes relay switch R90a in circuit 16 on being energized thus activating circuit 16 which is the end result of circuit 14. Relay switch R54a which is normally closed as shown is opened by means of relay R54 when circuit 16 has been completed thereby opening series loop 106 and removing the load on rectifier 84 and releasing pointer 83.

Circuit 16 includes leads 114 and 115 from transformer primary 22, manual reset switch 116, relays R117, R118, R54 and R56, normally open relay switches R90a, R118a and R118b, and indicator light 128. Manual reset switch 116 and indicator light 128 are positioned on the moisture control panel as shown in FIGURE 2. Circuit 16 functions to close normally open relay switch R54b and to change the position of relay switch R56a in circuit 12 by means of relays R54 and R56 respectively whereby capacitor 50 and resistor 52 are switched into circuit 12 thereby initiating the second stage of operation of the moisture meter. Circuit 16 also energizes relay R117 thus opening relay switch R117a and thereby shutting off the moisture addition to mill 63 by means of solenoid 118 operating valve 19 in moisture control circuit 121.

As indicated above the energizing of relay R90 in circuit 14 closes normally open relay switch R90a in circuit 16. Closing switch R90a by means of relay R90 energizes relay R118 through conductors 114 and 115 from transformer primary 22. Relay R118 in turn closes relay switches R118a and R118b. Closing relay switch R118a causes switch R90a to be bypassed through conductors 134 and 136 so that relay R118 remains energized after switch R90a has been opened due to the deenergizing of relay R90 in circuit 14. Relays R54, R56 and R117 and indicator light 128 are energized by the closing of relay switch R118b.

Relay R54 on being energized functions to close relay switch R54b in circuit 12 thereby placing capacitor 50 in circuit 12. Relay R54 also acts to open relay switch R54a in circuit 14 thereby deenergizing series loop 106 including relay R90 as previously indicated. Relay R56 functions to move relay switch R56a so that resistor 52 is placed in circuit 12. Indicator light 128 is intended to inform the operator of the moisture meter that the meter is in second stage operation and as indicated relay 117 functions to close valve 19 stopping the addition of moisture to the sand. The manual reset switch is provided to deenergize circuit 16 and thereby return the moisture meter to its first stage of operation.

In operation, a batch of sand the moisture content of which it is desired to raise to a predetermined level, is placed in mill 63 and shaft 67 is rotated. If rheostat 42 is used the temperature of the sand is read on dial 45 on the control panel of the moisture meter. Rheostat 42 is then set by rotating pointer 43 in relation to its associated temperature calibrations on the control panel of the moisture meter to the indicated sand temperature. The representation on indicator 18 will then be corrected for sand temperature. The type of sand being processed is noted and pointer 51 on the control panel is rotated in relation to its associated sand factor calibrations until it indicates the predetermined sand factor for the type of sand being processed. The rheostat 44 is thus adjusted so that the representation on indicator 18 is corrected for the type of sand being processed as previously explained. The moisture meter is now ready for first stage operation.

Switch 28 on the control panel of the moisture meter is then closed energizing transformer elements 22, 24 and 26 and also lighting light 30 on the control panel which indicates that power is being applied to the moisture meter. The sand placed in mill 63 acts as a variable impedance for probe 62 as previously explained. As a result of the probe 62 having a connection between its electrodes through the sand an alternating signal is developed in loop circuit 38 when transformer secondary 24 is energized. The alternating signal in closed loop 38 due to the alternating voltage impressed across the transformer secondary 24 will be a direct function of the moisture content of the sand in mill 63 as previously explained.

A portion of the alternating signal in loop 38 is tapped off between conductors 76 and 78 and is fed to rectifier 40 where it is rectified into a direct signal pulsating at 60 cycles per second and becoming relatively large as wheels 69 pass over probe 62. The pulsating direct signal is then impressed across condenser 46, rheostat 42, rheostat 44, and indicator 18 in series with resistor 48. The pulsating direct signal from rectifier 40 is smoothed by condenser 46 as previously explained so that the indication on indicator 18 will be stable during the first stage of operation of the moisture meter. The magnitude of the representation on indicator 18 will be proportional to the signal output of rectifier 40 and therefore the moisture content of the sand being processed. The absolute value of the indicator reading for a given signal from rectifier 40 will depend on the values of rheostat 42 or thermistor 47, rheostat 44 and resistor 48. As previously indicated these values must be chosen so that the indicator reading on the control panel of the moisture meter is low when the sand to be processed is first placed in mill 63.

The moisture content of the sand is then slowly increased. As the moisture content of the sand is increased the representation on indicator 18 will be increased proportionately until the upper limit of the indicator is approached. At this time the pulsating signal from rectifier 40 during the time wheels 69 pass over probe 62 will be so large that capacitor 46 will not properly smooth the signal and therefore the indication on indicator 18 will be unstable.

When the indicator 18 indicates a predetermined sand moisture content during first stage operation on a maximum swing of the new unstable indicator switch 88 which is mechanically connected to indicator 18 is closed automatically and is held closed by electromagnet 86. Closing switch 88 energizes relay R90 which closes relay switch R90a. Closing relay switch R90a energizes relay R118 which closes relay switches R118a and R118b. Closing relay switch R118b energizes relays R117, R54 and R56 and lights light 128 on the control panel indicating second stage operation. Relay R54 closes relay switch R54b putting capacitor 50 in circuit 12 and opens relay switch R54a in series loop 106 in circuit 14. Relay R56 moves switch R56a in circuit 12 putting resistor 52 in series with indicator 18. Relay R117 closes relay switch R117a energizing solenoid 119 in moisture control circuit 121 causing valve 19 to close halting moisture addition to mill 63.

As previously indicated capacitor 50 aids capacitor 46 in smoothing the output of rectifier 40 during second stage operation so that the larger pulsating signals from the rectifier will produce a stable indication on indicator 18. Resistor 52 aids the smoothing action of capacitor 50 and also reduces the portion of the signal from rectifier 40 which produces a reading on indicator 18. Therefore, the reading on indicator 18 after resistor 52 is placed in circuit 12 is again close to its lower limit. As more moisture is manually added to the sand being processed or as the moisture present is more evenly mixed the indicator reading will again move toward the upper limit of the indicator. When the desired moisture content of the thoroughly mixed sand is reached the sand is removed from mill 63. Manual reset switch 116 is then pressed causing relays R118, R54, R117 and R56 to be deenergized and circuits 12, 14 and 16 to return to their original condition as shown in FIGURE 1. Another batch of sand to be processed may then be placed in mill 63 and the cycle described above repeated.

Thus it can be seen that the moisture meter of the present invention measures the moisture content of sand in two stages. The first stage being from the initial placing of the sand to be processed in mill 63, which results in a low, stable moisture meter reading, until the indicated moisture content becomes large and the representation of this moisture content becomes unstable. At this point the addition of moisture to the sand is halted by the closing of switch 88 during a maximum swing of the unstable indicator 18 and capacitor 50 and resistor 52 are placed in circuit 12, thus initiating the second stage of operation of the moisture meter. Immediately after the insertion of capacitor 50 and resistor 52 in circuit 12 the representation on the indicator 18 of the moisture meter will again be low and stable. Moisture may therefore again be added or the present moisture more thoroughly mixed until the required amount is represented on indicator 18 for the thoroughly mixed sand.

FIGURE 3 is a partly diagrammatic partly schematic representation of a modified embodiment of the two stage moisture meter of the invention. The embodiment of FIGURE 3 is similar to the embodiment of FIGURE 1 except that two indicators 18 and 18' are provided in parallel in the embodiment of FIGURE 3 thus permitting the elimination of most of the relays and relay switches of the embodiment of FIGURE 1 which are necessary to provide relatively stable indications of moisture content during the greater portion of both phases of operation of the moisture meter on a single indicator and to provide a relatively unfiltered signal for halting the addition of moisture to the granular material as previously described.

In the FIGURES 1 and 3 the same elements have been given the same reference characters and perform similar functions, the details of the operation of the modification of FIGURE 3 should therefore be apparent in view of the previous discussion and will not be further considered at this time. It will however be noted that the only filtering of the signal from rectifier 40 applied to indicator 18 in the modification of FIGURE 3 is accomplished with capacitor 50. The signal through indicator 18 will therefore be substantially unfiltered for large signal values from rectifier 40 as is the case with the embodiment of FIGURE 1 wherein capacitor 46 provides some filter action for indicator 18 during first stage operation before capacitor 50 is switched into the circuit. It will also be noted that both temperature factor rheostat 42 and a temperature sensitive resistance 47 are provided in parallel in the modification of FIGURE 3. Such arrangement allows for an initial and a continuing temperature correction of the indicated moisture content of the granular material by the rheostat 42 and resistance 47 respectively and allows the use of a resistance 47 variable over a smaller resistance range than would be possible if resistance 47 were the only temperature correction means provided.

In the operation of the modification of FIGURE 3 both indicators 18 and 18' will be viewable by the operator. As the moisture content of the granular material is increased and the substantially unfiltered signal from rectifier 40 on indicator 18 becomes relatively unstable the operator merely turns his attention to indicator 18' for a stable reading of the moisture content of the material. As in the embodiment of FIGURE 1 the water addition to the granular material is halted by energizing solenoid 119 which is accomplished by unstable indicator 18 closing switch 88. The switch 88 is thus closed as before by a meter which responds directly to a substantially unfiltered signal from rectifier 40. No time lag is therefore present in the closing of switch 88 due to a signal of particular magnitude from rectifier 40 such as would be present were the signal from the rectifier first filtered and then used to close switch 88 as it would be if the stable signal from indicator 18' were used to close the switch.

Thus, in the modification of FIGURE 3 as in FIGURE 1 the moisture meter operates in two phases. The first phase of operation is during the initial addition of moisture to the granular material when the operator may read the moisture content from indicator 18. The change of stages is accomplished when the moisture content of the granular material in mill 63 becomes such that the signal received by indicator 18 from rectifier 40 as previously explained is large and relatively unstable causing switch 88 to close energizing solenoid 119 to turn off the supply of moisture to the granular material. The second stage of operation as before is then during the final mixing of the granular material during which the moisture content is read on stable indicator 18'.

The drawing and the foregoing specification constitute a description of the improved two stage moisture meter in such full, clear, concise and exact terms as to enable any person skilled in the art to practice the invention, the scope of which is indicated by the appended claims.

What we claim as our invention is:

1. Conditioning apparatus for granular material comprising means for periodically producing an electric signal proportional to the moisture content of the granular material including an electronic probe exposed to the granular material, a variable resistance and a transformer connected in series in a closed loop circuit, means for mixing the granular material and pressing a specimen of the granular material against the probe at predetermined intervals, a rectifier connected in parallel with part of the variable resistance, a meter actuating coil and a meter resistor connected in series with each other across the output of the rectifier, a meter capacitor connected in parallel with the coil and meter resistor, a signal reducing resistor, means for connecting the signal reducing resistor in series with the meter resistor in response to the electric signal reaching a predetermined value, a signal stabilizing capacitor, means for connecting the signal stabilizing capacitor in parallel with the meter capacitor in response to the electric signal reaching said predetermined value, means for adding moisture to the granular material, and means for stopping the addition of moisture to the granular material when the signal reaches the predetermined value.

2. Structure as claimed in claim 1 wherein said means for connecting the signal reducing resistor and stabilizing capacitor in circuit with the meter resistor and capacitor comprises an indicator needle actuated by said coil, a second closed loop electric circuit including a source of electric energy, a switch movable by the meter indicator needle to a closed position at said predetermined signal value, a holding solenoid for said switch, a first relay coil and a first relay switch in series, and a third closed loop electric circuit including a source of electric energy, a second relay switch closable by said first relay coil on energization thereof and a plurality of parallel relay coils in series, one of said plurality of relay coils being operable to open said first relay switch on energization thereof, and relay switches in series with said signal reducing resistor and signal stabilizing capacitor closable on energization of others of said plurality of parallel relay coils.

3. Conditioning apparatus for granular material comprising means for periodically producing an electric signal proportional to the moisture content of the granular material including an electronic probe exposed to the granular material, a variable resistance and a transformer connected in series in a closed loop circuit, means for mixing the granular material and pressing a specimen of the granular material against the probe at predetermined intervals, a rectifier connected in parallel with part of the variable resistance, a meter actuating coil and a meter resistor connected in series with each other across the output of the rectifier, a meter capacitor connected in parallel with the coil and meter resistor, a signal reducing resistor, means for connecting the signal reducing resistor in series with the meter resistor in response to the electric signal reaching a predetermined value, means for adding moisture to the granular material, and means for stopping the addition of moisture to the granular material when the signal reaches the predetermined value.

4. Conditioning apparatus for granular material comprising means for periodically producing an electric signal proportional to the moisture content of the granular material including an electronic probe exposed to the granular material, a variable resistance and a transformer connected in series in a closed loop circuit, means for mixing the granular material and pressing a specimen of the granular material against the probe at predetermined intervals, a rectifier connected in parallel with part of the variable resistance, a meter actuating coil and a meter resistor connected in series with each other across the output of the rectifier, a meter capacitor connected in parallel with the coil and meter resistor, a signal stabilizing capacitor, means for connecting the signal stabilizing capacitor in parallel with the meter capacitor in response to the electric signal reaching said predetermined value, means for adding moisture to the granular material, and means for stopping the addition of moisture to the granular material when the signal reaches the predetermined value.

5. Conditioning apparatus for granular material comprising means for periodically producing an electric signal proportional to the moisture content of the granular material, a meter connected across the output of the means for producing the electric signal proportional to moisture content, a signal reducing resistor, means for connecting the signal reducing resistor in series with the meter in response to the electric signal reaching a predetermined value, a signal stabilizing resistor, means for connecting the signal stabilizing resistor in parallel with the meter in response to the electric signal reaching said predetermined value, means for adding moisture to the granular material, and means for stopping the addition of moisture to the granular material when the signal reaches the predetermined value.

References Cited in the file of this patent
UNITED STATES PATENTS

| | | |
|---|---|---|
| 2,244,722 | Norcross | June 10, 1941 |
| 2,852,740 | Posey | Sept. 16, 1958 |
| 2,856,948 | Martin | Oct. 21, 1958 |
| 2,863,191 | Dietert et al. | Dec. 9, 1958 |
| 2,865,000 | Newell | Dec. 16, 1958 |
| 2,886,868 | Dietert et al. | May 19, 1959 |
| 2,894,251 | Ruffle | July 7, 1959 |
| 2,896,165 | Hornig et al. | July 21, 1959 |